(12) United States Patent
Kerckhove

(10) Patent No.: US 9,970,167 B1
(45) Date of Patent: May 15, 2018

(54) SWEEPER AND FRAME FOR UTV

(71) Applicant: Newgen Sweepers, Inc., Carbon Cliff, IL (US)

(72) Inventor: Jerry Kerckhove, Carbon Cliff, IL (US)

(73) Assignee: Newgen Sweepers, Inc., Carbon Cliff, IL (US)

( * ) Notice: Subject to any disclaimer, the term of this patent is extended or adjusted under 35 U.S.C. 154(b) by 0 days. days.

(21) Appl. No.: 15/382,592

(22) Filed: Dec. 16, 2016

Related U.S. Application Data

(60) Provisional application No. 62/268,447, filed on Dec. 16, 2015.

(51) Int. Cl.
| | | |
|---|---|---|
| *E01H 1/08* | (2006.01) | |
| *B60P 1/16* | (2006.01) | |
| *B60P 1/34* | (2006.01) | |
| *E01H 1/04* | (2006.01) | |

(52) U.S. Cl.
CPC .............. *E01H 1/0863* (2013.01); *B60P 1/16* (2013.01); *B60P 1/34* (2013.01); *E01H 1/047* (2013.01); *E01H 1/0872* (2013.01); *E01H 2001/0881* (2013.01)

(58) Field of Classification Search
CPC ..... E01H 1/0863; E01H 1/0872; E01H 1/047; E01H 2001/0881; E01H 1/08
USPC .......................................... 15/340.1
See application file for complete search history.

(56) References Cited

U.S. PATENT DOCUMENTS

| | | | | |
|---|---|---|---|---|
| 4,006,511 A | * | 2/1977 | Larsen ................. | E01H 1/0845 15/340.3 |
| 4,227,893 A | * | 10/1980 | Shaddock ............. | B60P 1/60 15/340.1 |
| 4,660,248 A | * | 4/1987 | Young .................. | E01H 1/0863 15/340.1 |
| 5,113,548 A | * | 5/1992 | Young .................. | B60P 1/162 15/340.1 |
| 5,852,847 A | * | 12/1998 | Weiss ................... | E01H 1/0827 15/340.1 |

* cited by examiner

*Primary Examiner* — David Redding
(74) *Attorney, Agent, or Firm* — Hamilton IP Law, PC; Jay R. Hamilton; Charles Damschen

(57) ABSTRACT

An improved sweeper and frame for a utility task vehicle includes a mounting frame which is attachable/detachable to the rear portion of the vehicle allowing detachment/attachment of the box portion of the vehicle as needed. The utility task vehicle mounting frame may be coupled with a lifting system to allow hydraulic aided dumping of the debris collection box of the sweeper system.

8 Claims, 24 Drawing Sheets

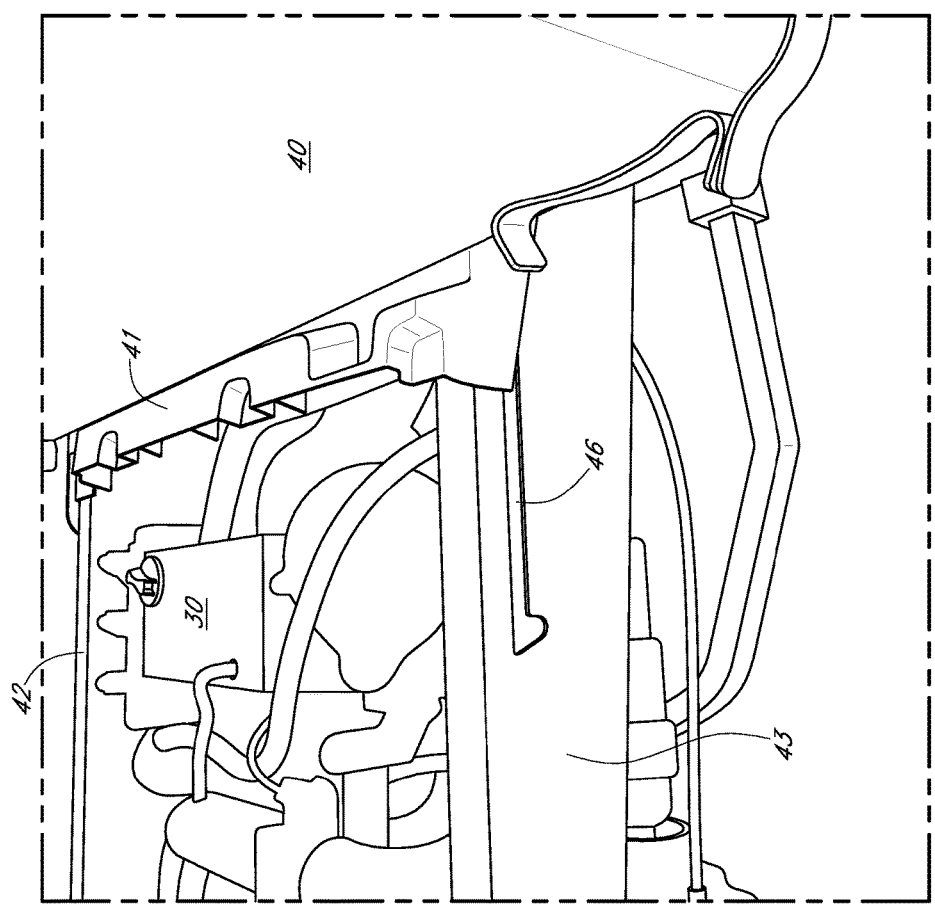

SWEEPER AND FRAME FOR UTV

CROSS REFERENCE TO RELATED APPLICATIONS

This application claims priority from provisional U.S. Pat. App. No. 62/268,447 filed on Dec. 16, 2015, which is incorporated by reference herein in its entirety.

FIELD OF THE INVENTION

This invention relates to a quick-attach or mounting assembly for positioning and attaching an implement such as a sweeper to an off-road vehicle such as an utility task vehicle as shown and disclosed herein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

N/A

AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

SUMMARY OF THE INVENTION

The improved sweeper and frame for the utility task vehicle (hereinafter referred to "UTV") disclosed herein provides multiple improvements over the prior art. The improved novel frame and the attachment portions allow for attachment of the sweeper system disclosed herein to an UTV equipped with a rear dump box, shown here as a John Deere "Gator", but in no way limited to that and may include vehicles made by Arctic Cat, Argo UTV, BMS Motorsports, Barn X, Bennche, Bobcat, Bush Hog, Can Am, Carter Brothers, Case IH, CFMoto, Club Car, Cub Cadet, Textron Specialized Vehicles, Hisun, Honda, Husqvarna, Intimidator UTV, Kawasaki, Kioti, Kubota, KYMCO, New Holland, Polaris, QLINK Motor, Ruesch Motors, Siorfi-UTV, TGB—Taiwan Golden Bee Company, Tomcar and Yamaha Rhino, without restriction or limitation herein. The improved sweeper and frame for a UTV allows for improved use and capacity compared to truck mounted systems known in the prior art. Another improvement is the ease of use for attachment and detachment to an UTV having a removable rear dump box configuration.

BRIEF DESCRIPTION OF THE DRAWINGS

The accompanying drawings, which are incorporated in and constitute a part of this specification, illustrate embodiments and together with the description, serve to explain and illustrate the principles of the Improved Sweeper and Frame for UTV (hereinafter referred to simply as the "Sweeper and Frame") as disclosed herein.

FIG. 3C is a side view of the front portion of an UTV frame with the dump box removed.

Figure 1:
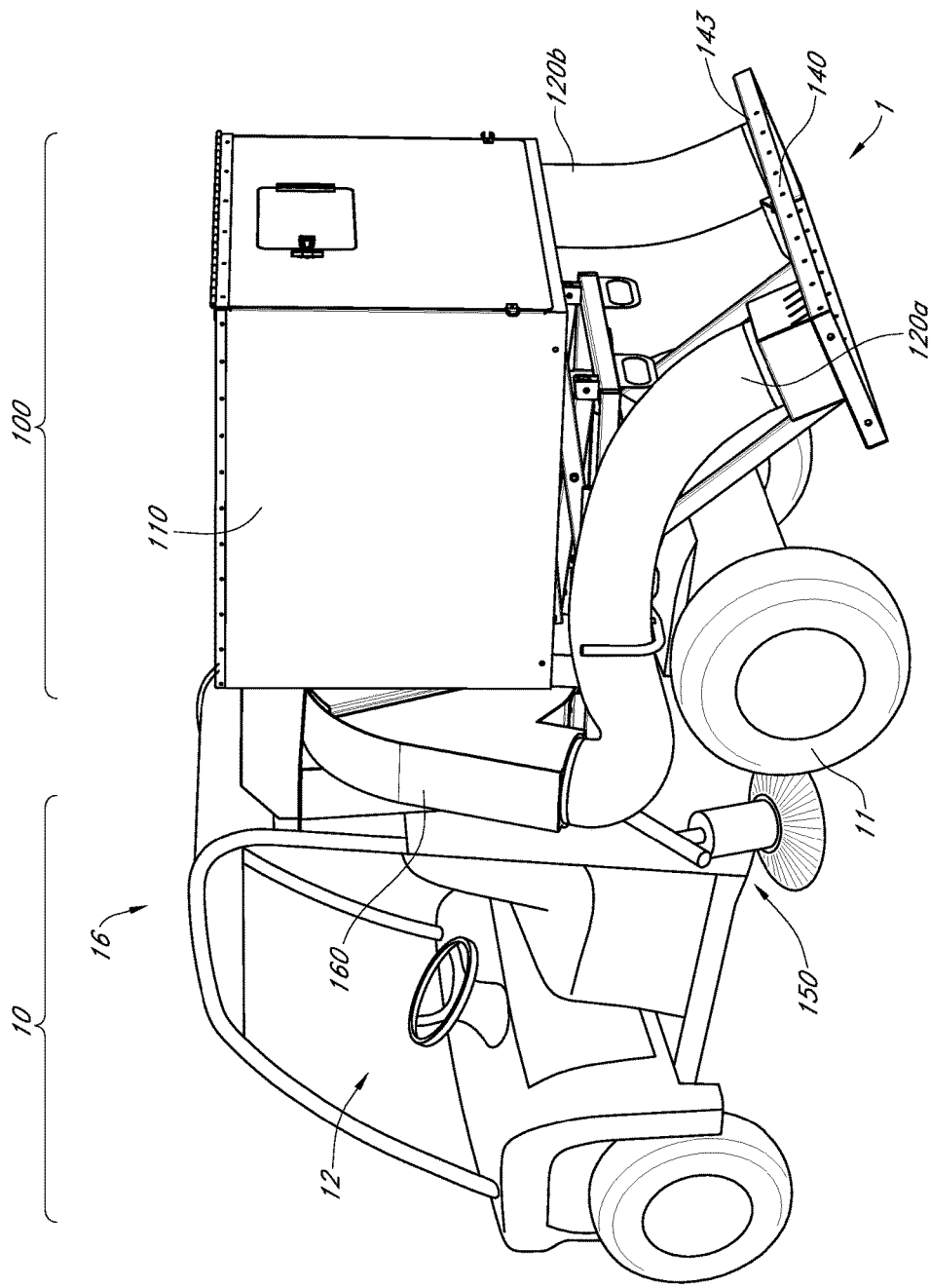
FIG. 1 is a perspective view of the Sweeper and Frame disclosed herein as mounted upon an UTV.

Appendices A, B and C are included herein and provides additional inventor disclosure and description for implementation, as provided by the inventor for inclusion herein, and may be claimed in whole or in part, for its use in the implementation of the present disclosure, and is fully incorporated by reference herein.

DETAILED DESCRIPTION—LISTING OF ELEMENTS

| Element Description | Element number |
| --- | --- |
| 1 | Ground surface |
| 2 | Debris (dirt, leaves, trash) (not shown) |
| 10 | UTV |
| 11 | Wheel and Tire |
| 12 | Driver/Passenger area |
| 13 | Transmission system (not shown) |
| 14 | Suspension system |
| 16 | ROPS (roll-over protection system) |
| 18 | Jack |
| 20 | UTV dump box |
| 30 | UTV engine |
| 40 | UTV frame |
| 41 | UTV frame front rail |
| 42 | UTV frame left-side rail |
| 43 | UTV frame right-side rail |
| 44 | UTV frame rear rail |
| 45 | UTV muffler |
| 46 | UTV frame slot |
| 47 | UTV frame aperture(s) |
| 48 | Fastener (bolt & nut or screws) |
| 49 | Hydraulic cylinder |
| 60 | Bag |
| 70 | Dumpster |
| 80 | Taillight |
| 100 | Sweeper system |
| 110 | Debris collection box |
| 111 | Debris collection box outlet |
| 112 | Door |
| 113 | Door plate |
| 114 | Hinge |
| 115 | Filter (not shown) |
| 120a | Hose - discharge (outlet) |
| 120b | Hose - return (suction) |
| 130 | Sweeper motor (engine) |
| 140 | Floating sweeper head |
| 141 | Sweeper head frame |
| 142 | Sweeper head channel |
| 143 | Sweeper head outlet |
| 145 | Sweeper Head |
| 146a | Sweeper head ring |
| 146b | Blower ring |
| 147 | Sweeper head intake plate |
| 148 | Lift bracket |
| 149 | |
| 150 | Curb Broom |
| 160 | Blower |
| 161 | Blower intake weldment |
| 162 | Blower discharge outlet |
| 163 | |
| 164 | |
| 170 | Suction - blower return |
| 180 | Sweeper Frame |

-continued

| Element Description | Element number |
| --- | --- |
| 181 | Mounting frame front rail |
| 182 | Mounting frame inner rail(s) |
| 183 | Mounting frame rear rail |
| 184 | Engine mount plate |
| 185 | Blower housing mount |
| 186 | Sweeper head mount |
| 187 | Mounting frame side rail |
| 188 | Blower housing bracket |
| 189 | Engine mounting rail mid frame |
| 190 | |
| 191 | Linkage mount tab |
| 192 | Roller bearing bracket |
| 192a | Roller bearing (not shown) |
| 193 | Linkage mount rail |
| 194 | Cylinder bracket (floating head sweeper) |
| 195 | Taillight bracket |
| 196 | UTV mounting bracket |
| 198 | UTV frame mounting bracket |
| 199 | Box mounting frame |
| 200 | Debris collection box lifting system |
| 200a | Debris collection box lifting system - first end |
| 200b | Debris collection box lifting system - second end |
| 201 | Linkage H-Frame rectangular tube |
| 202 | Linkage H-Frame cross tube |
| 202a | Linkage cylinder lift bracket |
| 202b | Linkage H-Frame cross tube |
| 203 | Linkage pick-up tube |
| 204 | Rectangular tube to linkage H-frame pin |
| 205 | Box to hinge pin |
| 206 | Pin |

DETAILED DESCRIPTION

Before the present Sweeper and Frame is disclosed and described, it is to be understood that the Sweeper and Frame is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed Sweeper and Frame and method of attaching and detaching the Sweeper and Frame from an UTV. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all Sweeper and Frame. This applies to all aspects of this application including, but not limited to, components of a Sweeper and Frame. Thus, if there are a variety of additional components that can be added it is understood that each of these additional components can be added with any specific embodiment or combination of embodiments of the Sweeper and Frame. The present Sweeper and Frame may be understood more readily by reference to the following detailed description of preferred embodiments and the examples included therein and to the Figures and their previous and following description.

In one embodiment, the Sweeper and Frame may be constructed of material of sufficient strength and durability to support engagement with an UTV (aka Gator) for use in collection and or engagement with debris as may be found on a street or in a parking lot. It is contemplated that in the illustrative embodiment shown in the enclosed FIGS. may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density).

Figure 1A:
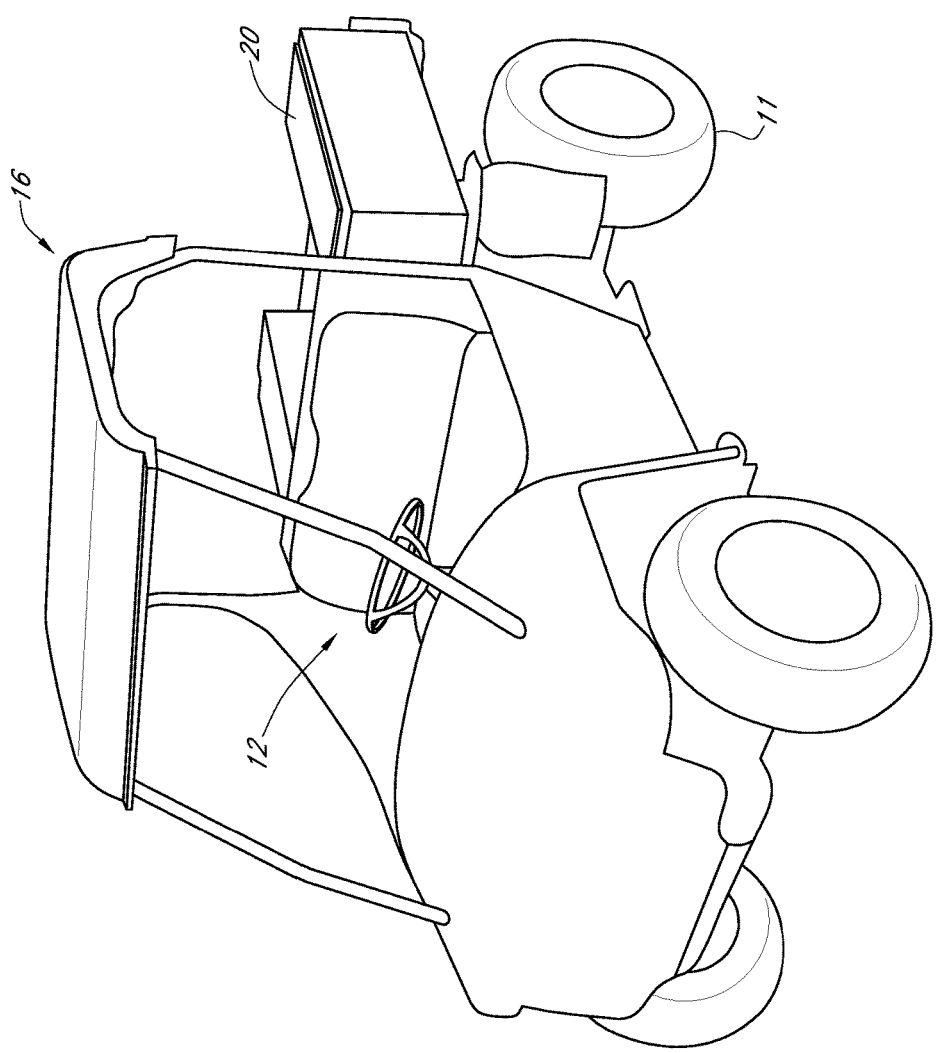
FIG. 1A is a perspective view of a prior art UTV made by John Deere and known as a Gator with a dump box attachment at the rear of the UTV.
Figure 2:
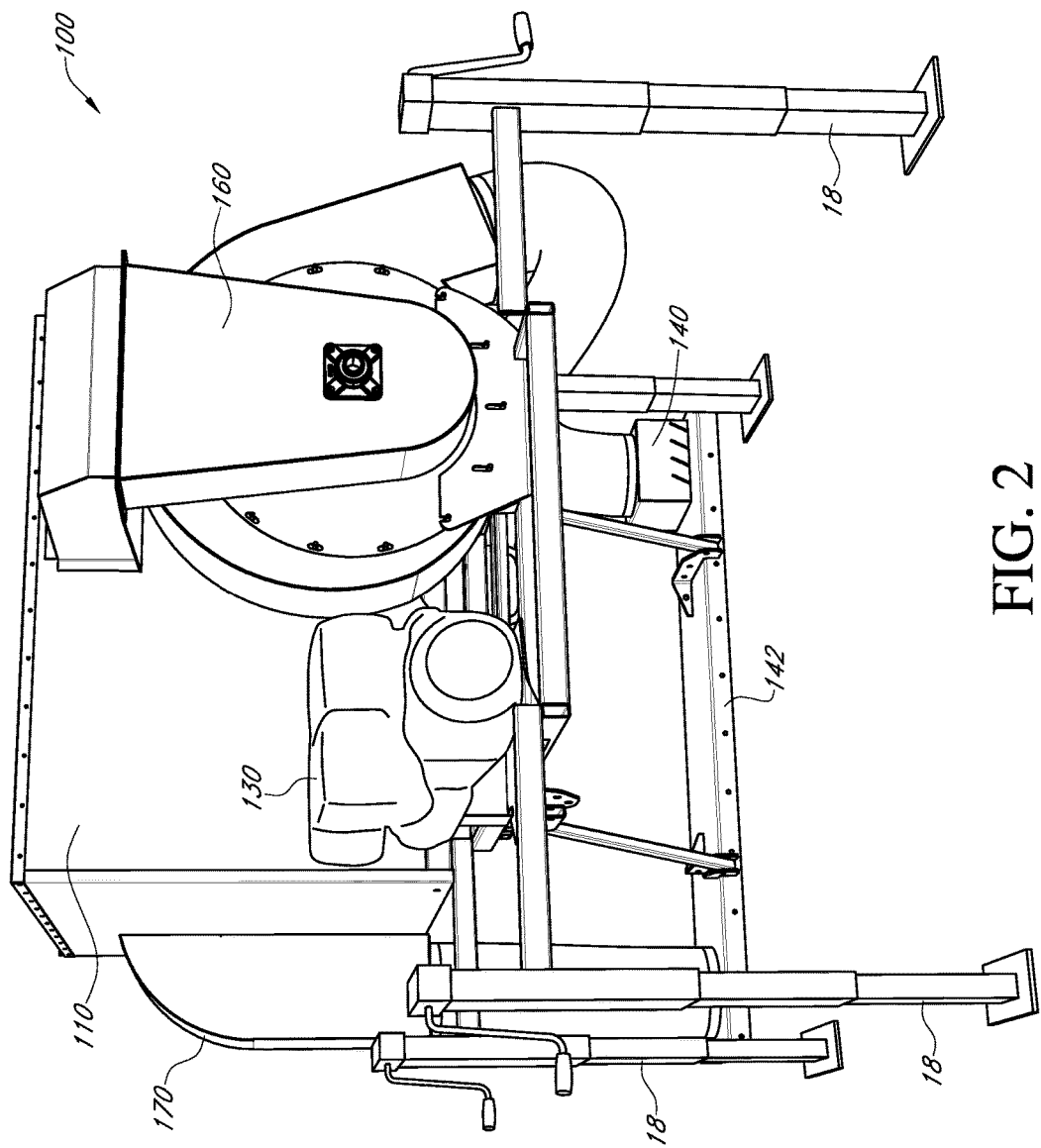
FIG. 2 is a front perspective view of the Sweeper and Frame for UTV positioned on a jack stand for attachment to an UTV.
Figure 3:
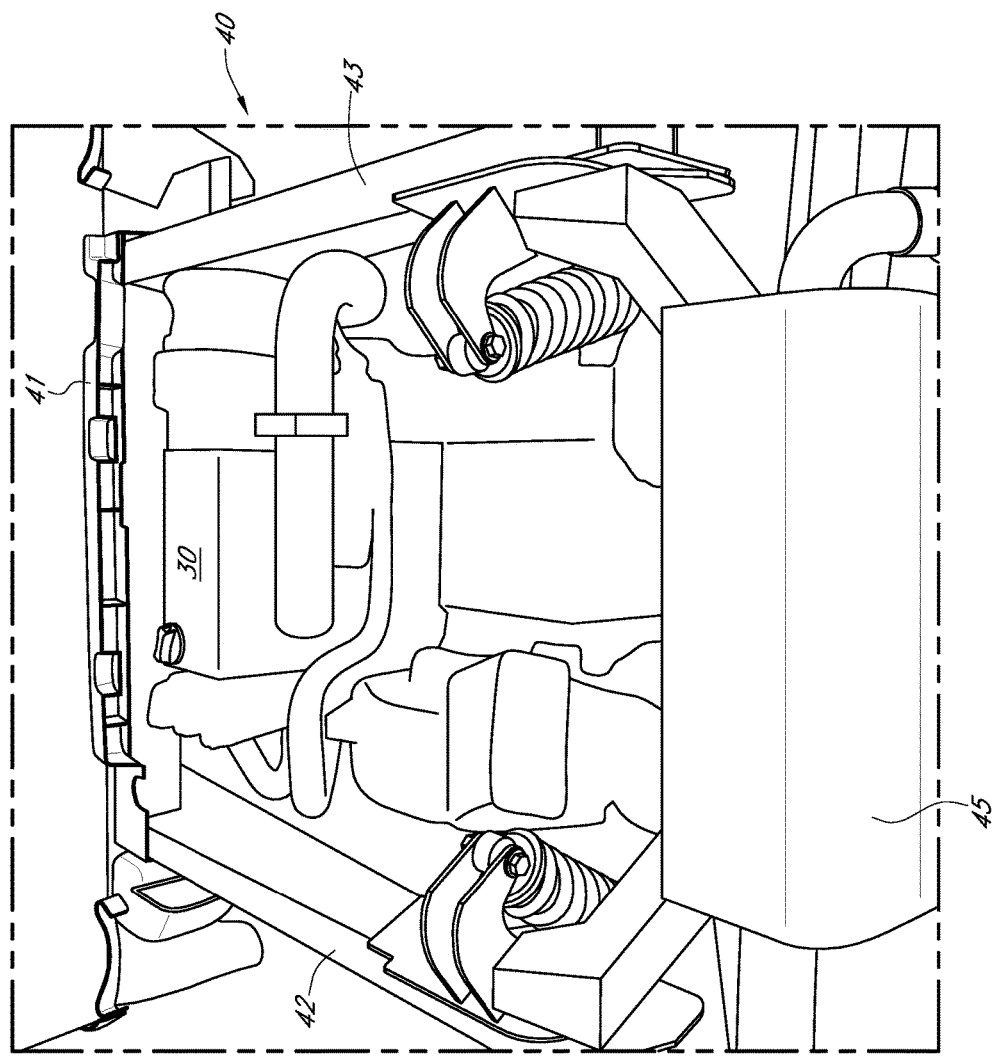
FIG. 3 is a rear perspective view of an UTV frame with the dump box removed.
Figure 3A:
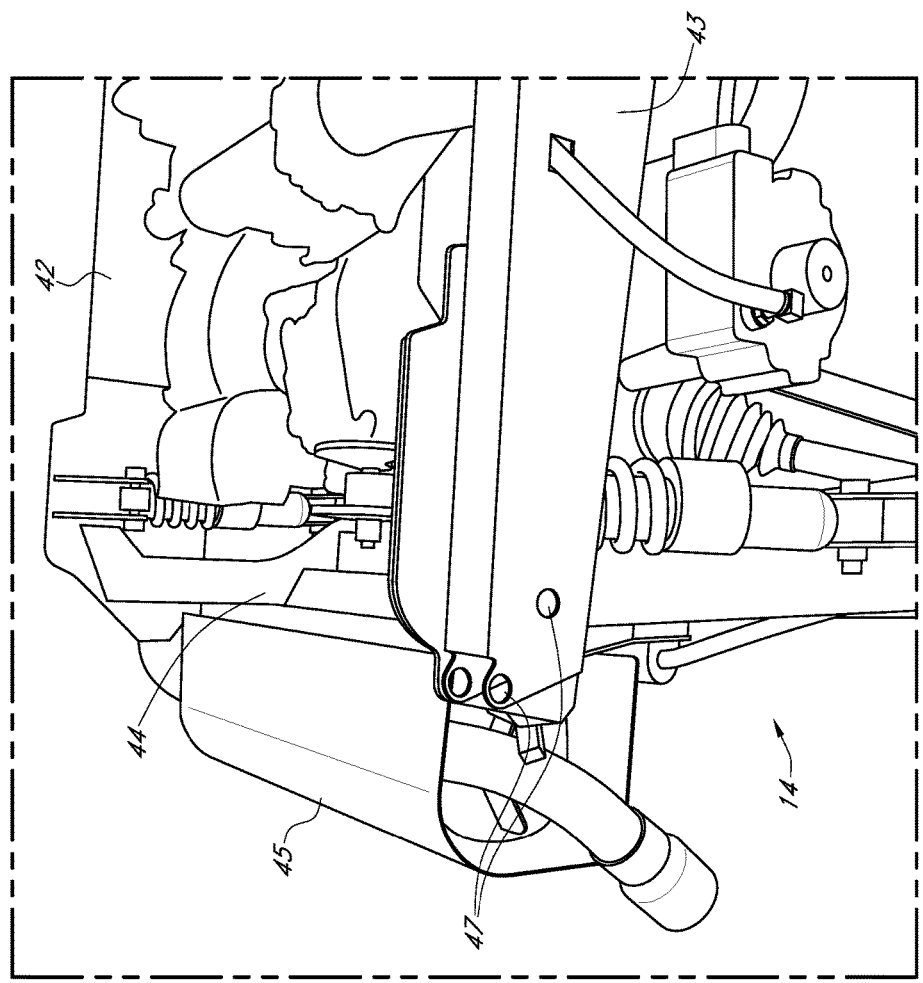
FIG. 3A is a right-side perspective view of the rear portion of an UTV frame with the dump box removed.
Figure 3B:
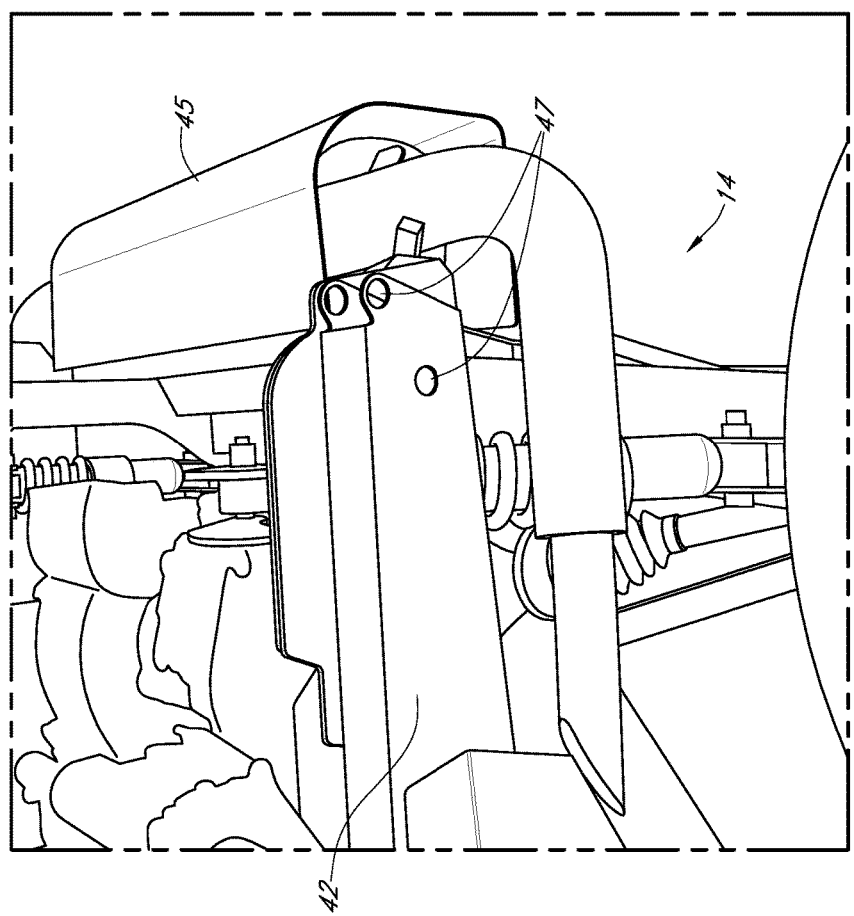
FIG. 3B is a left-side perspective view of the rear portion of an UTV frame with the dump box removed.

FIG. 1 provides a front perspective view of one illustrative embodiment of the Sweeper and Frame 100 illustrating the mounting and attachment of the novel sweeper system 100 via its mounting frame 180 to a UTV 10. As shown, the sweeper system 100 is affixed to the UTV frame 40 and is positioned behind the driver and passenger area 12. FIG. 1A is a perspective view of a prior art UTV 10 made by John Deere and known as a Gator with a dump box 20 attachment at the rear of the UTV 10. As shown in FIGS. 2 and 3, it will be apparent to one of ordinary skill that the sweeper system 100 is removable from the UTV 10 which typically is configured with a rear box or dump box 30. As shown in FIG. 2, the sweeper system 100 may be positioned on a jack stand 18 when not mounted on the UTV 10. As shown in FIG. 3 the novel frame 40 allows removal of the box portion 30 of the UTV 10 for attachment of the frame 40. After the frame 40 has been installed, the sweeper system 100 may be attached for mounting as needed. FIG. 3A is a right-side perspective view of the rear portion of an UTV frame 40 with the dump box 20 removed. FIG. 3B is a left-side perspective view of the rear portion of an UTV frame 40 with the dump box 20 removed. FIG. 3C is a side view of the front portion of an UTV frame 40 with the dump box 20 removed.

Figure 4:
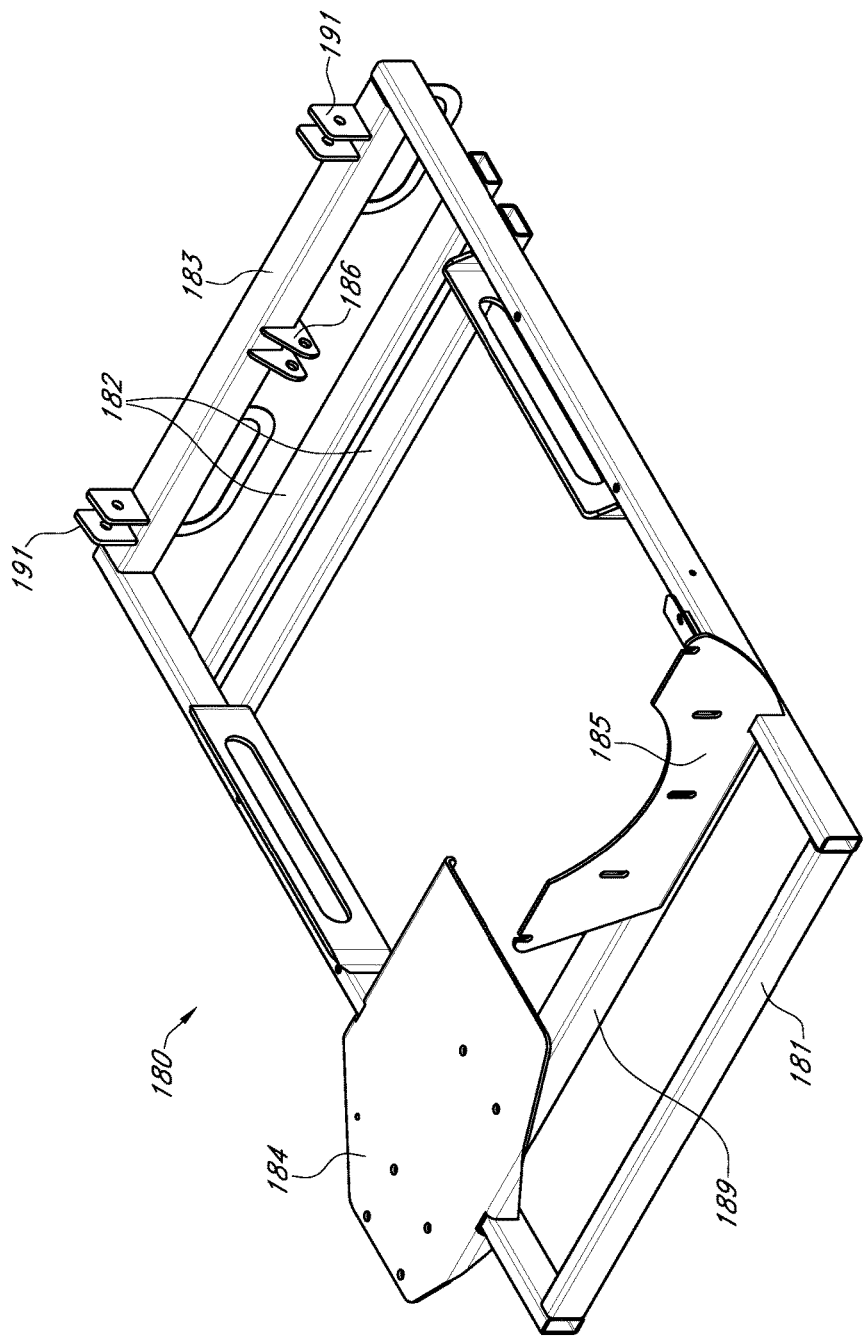
FIG. 4 is a front perspective view of the mounting frame for the sweeper system including blower and sweeper engine.

FIG. 4 is a front perspective view of the mounting frame 180 for the sweeper system 100 including blower 160 and sweeper engine 130.

Figure 4A:
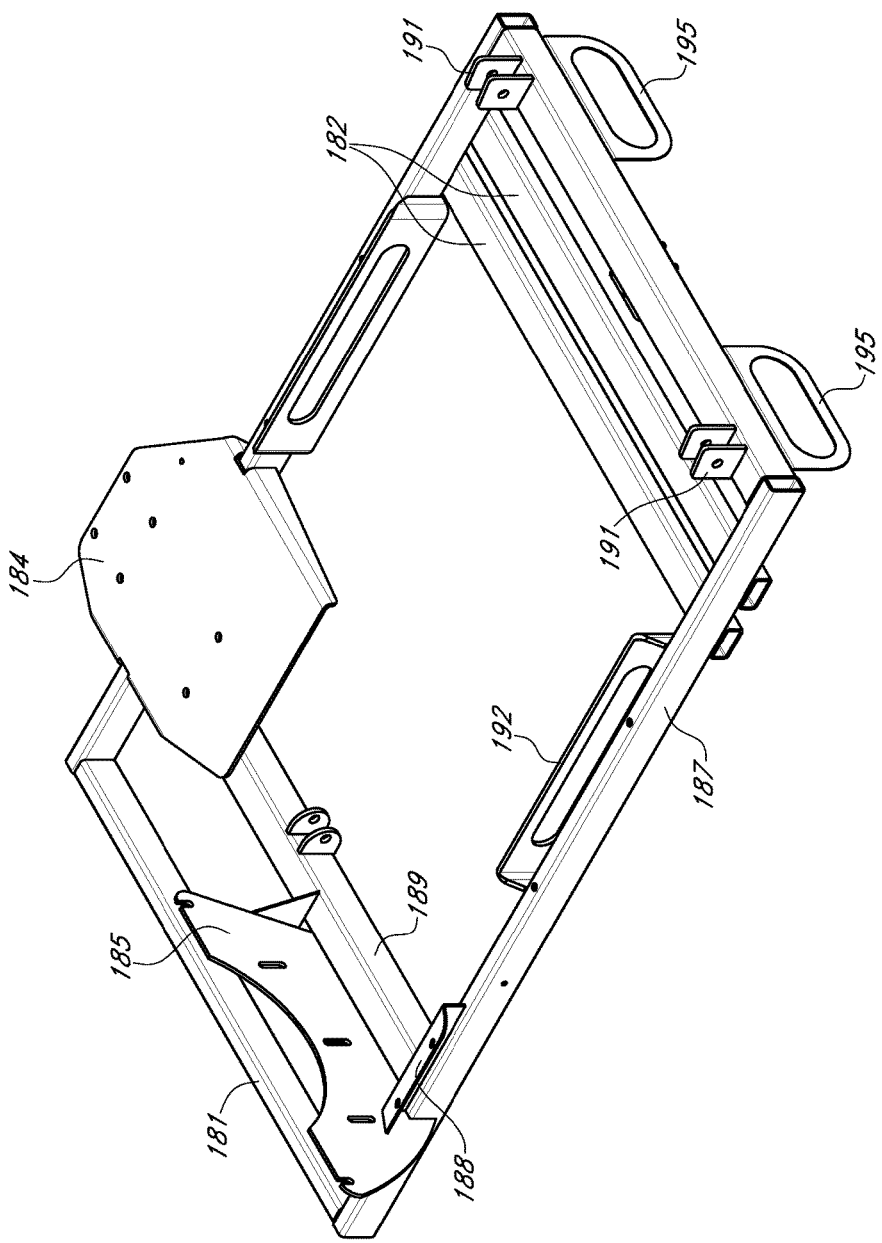
FIG. 4A is a rear perspective view of the mounting frame for sweeper system including blower and engine.

FIG. 4A is a rear perspective view of the mounting frame 180 for sweeper system 100 including blower 160 and sweeper engine 130.

Figure 4B:
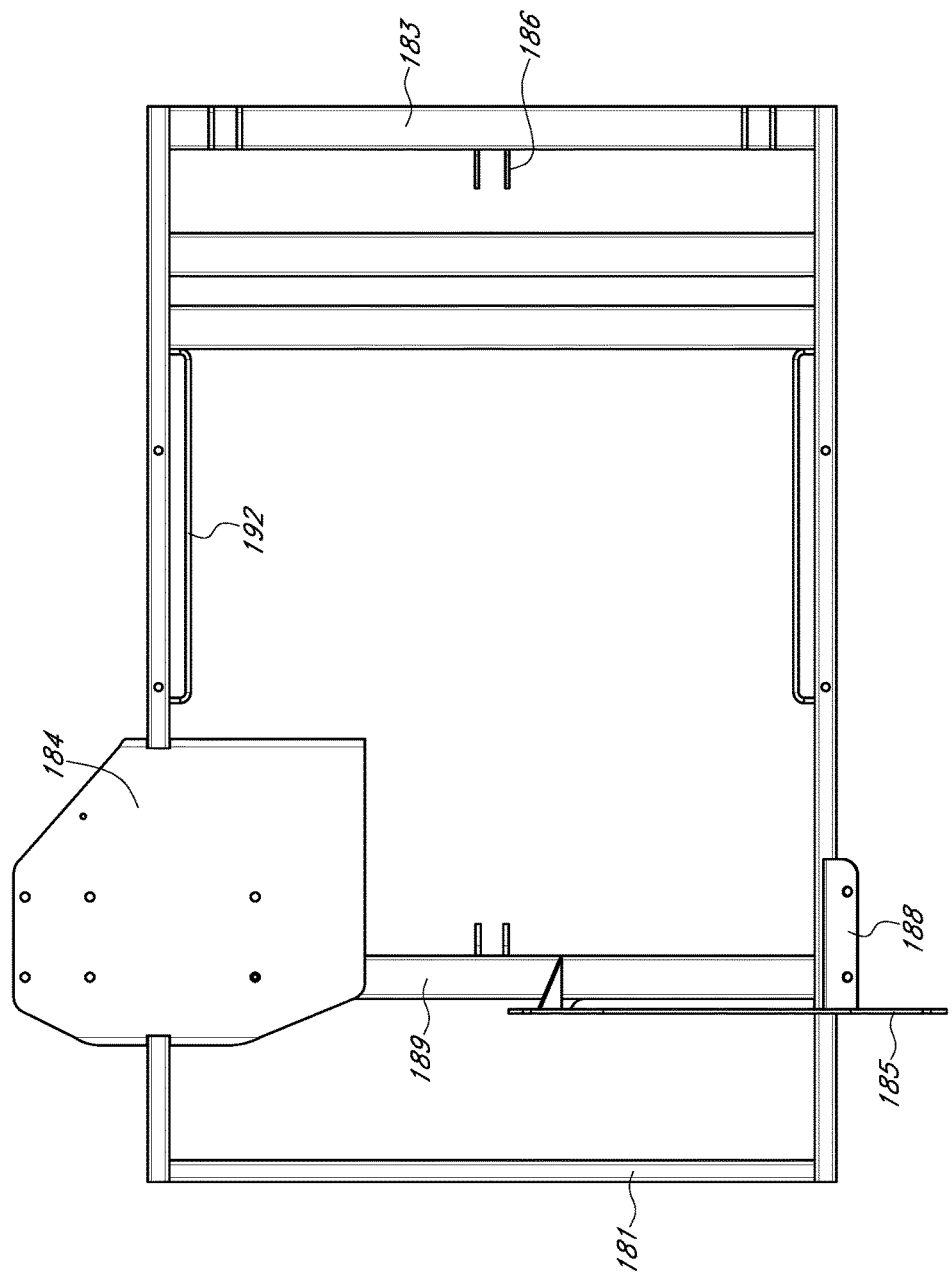
FIG. 4B is a top view of the UTV mounting frame for the sweeper system.

FIG. 4B is a top view of the UTV mounting frame 180 for the sweeper system 100.

Figure 5:
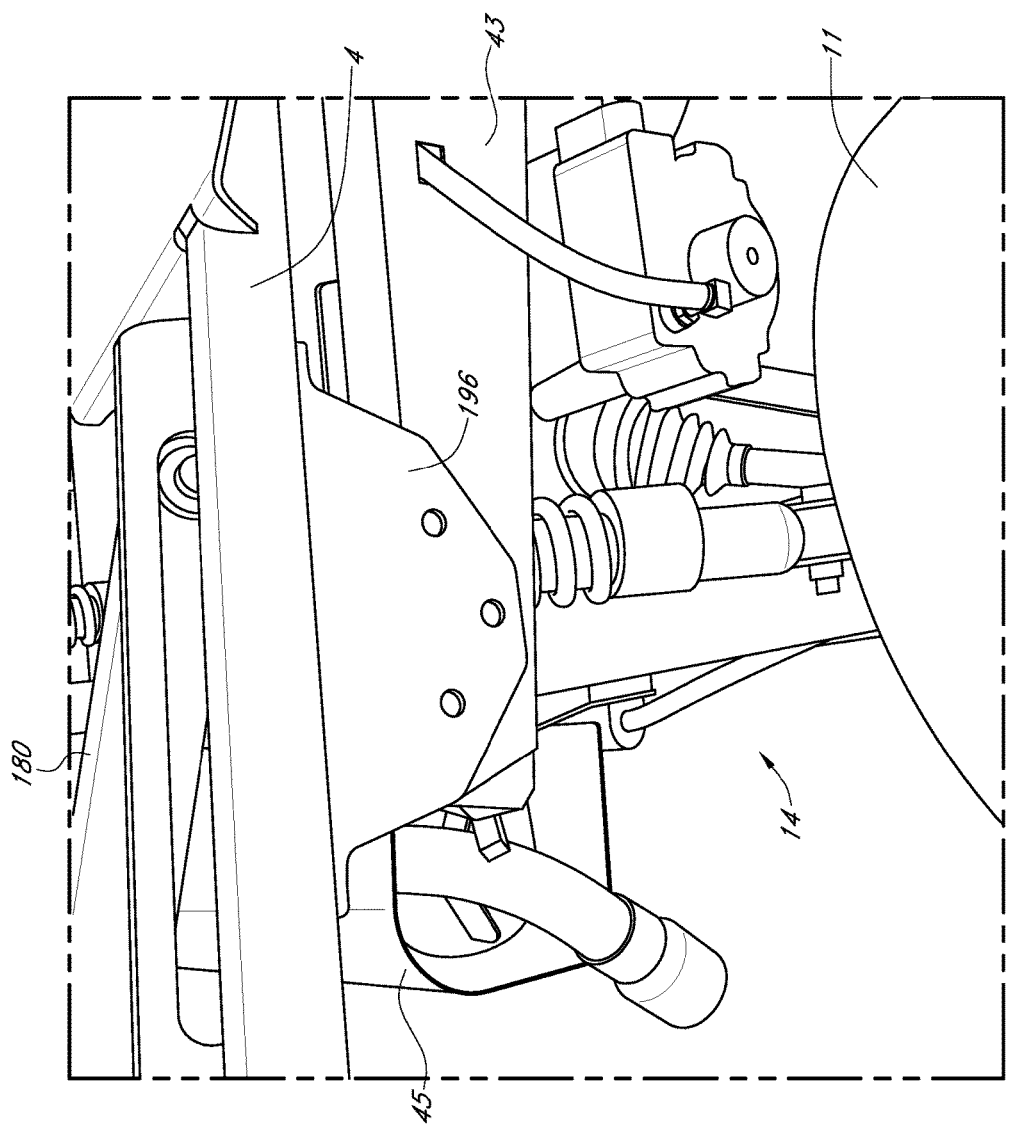
FIG. 5 is a side perspective view at the rear portion of the UT bracket mounted to the UTV frame with the dump box removed.

FIG. 5 is a side perspective view at the rear portion of the UT bracket 196 mounted to the UTV frame 198 with the dump box 20 removed.

Figure 5A:
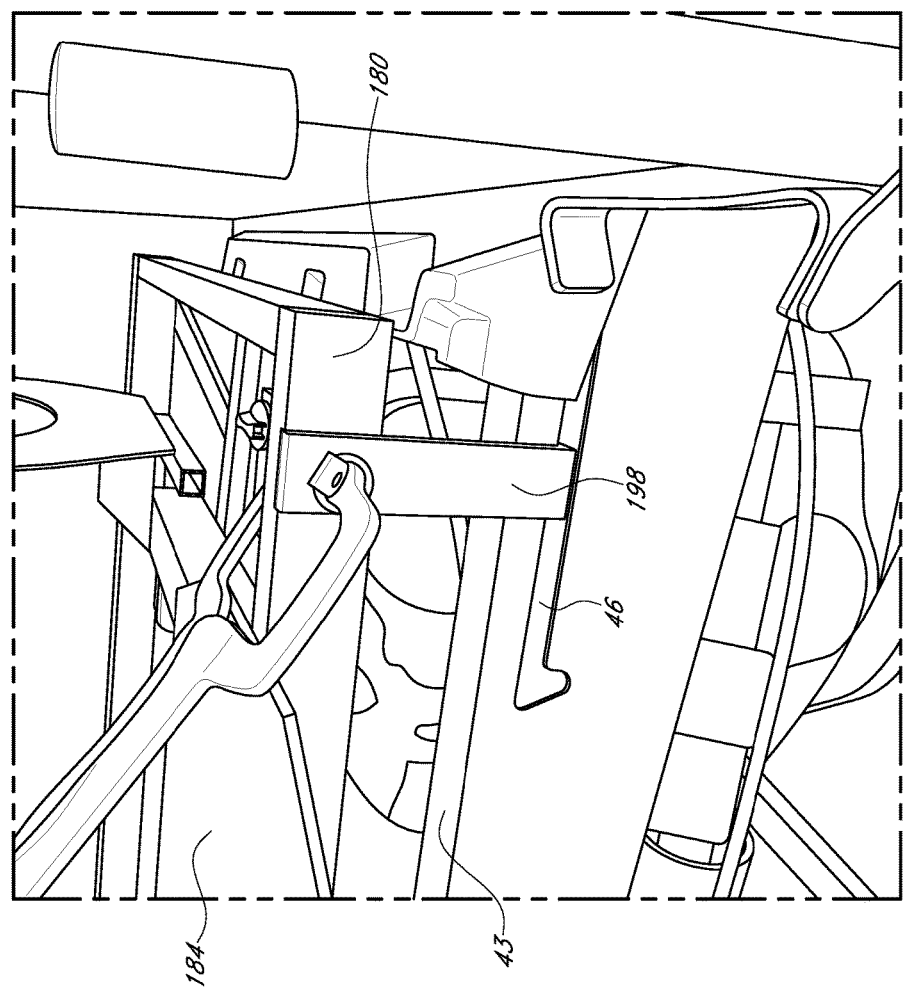
FIG. 5A is a side perspective view at the front portion of the UT bracket mounted to the UTV frame with the dump box removed.

FIG. 5A is a side perspective view at the front portion of the UT bracket 196 mounted to the UTV frame 198 with the dump box 20 removed.

Figure 6:
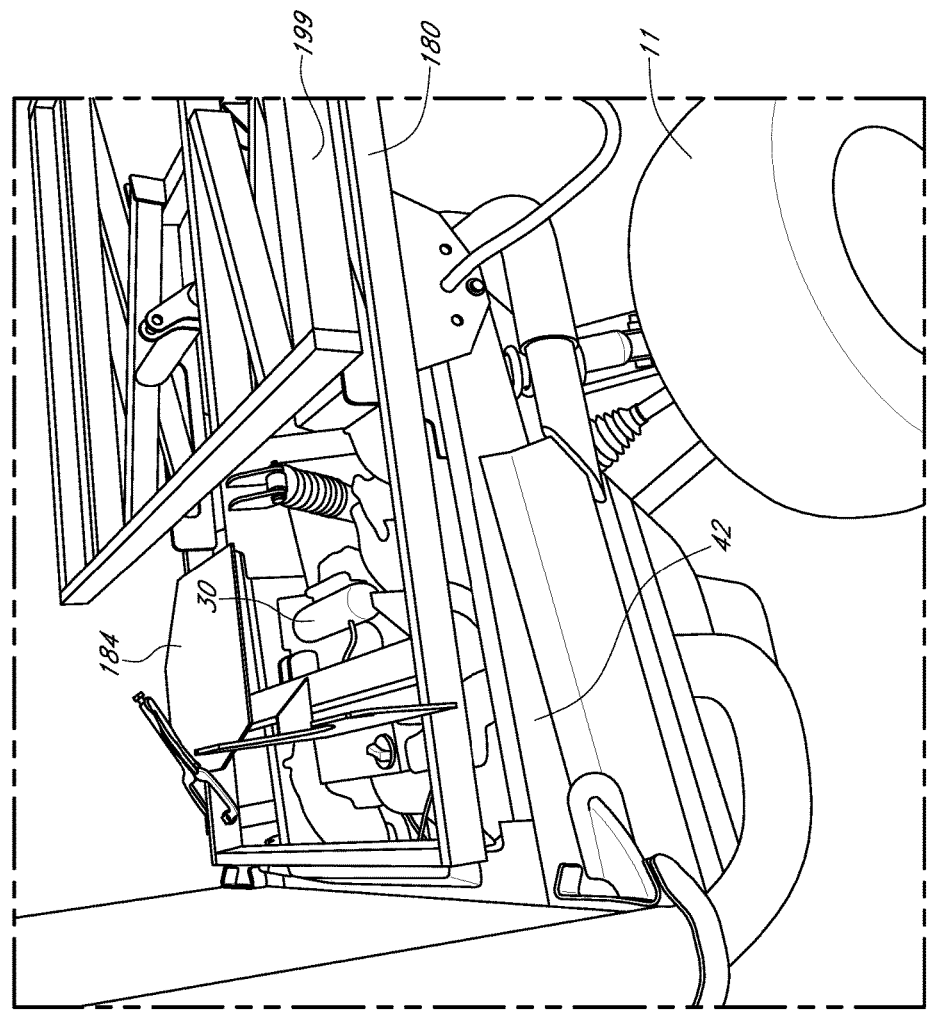
FIG. 6 is a side perspective view at the front portion of the box mounting frame with the dump box removed.

FIG. 6 is a side perspective view at the front portion of the box mounting frame 199 with the dump box 20 removed.

Figure 6A:
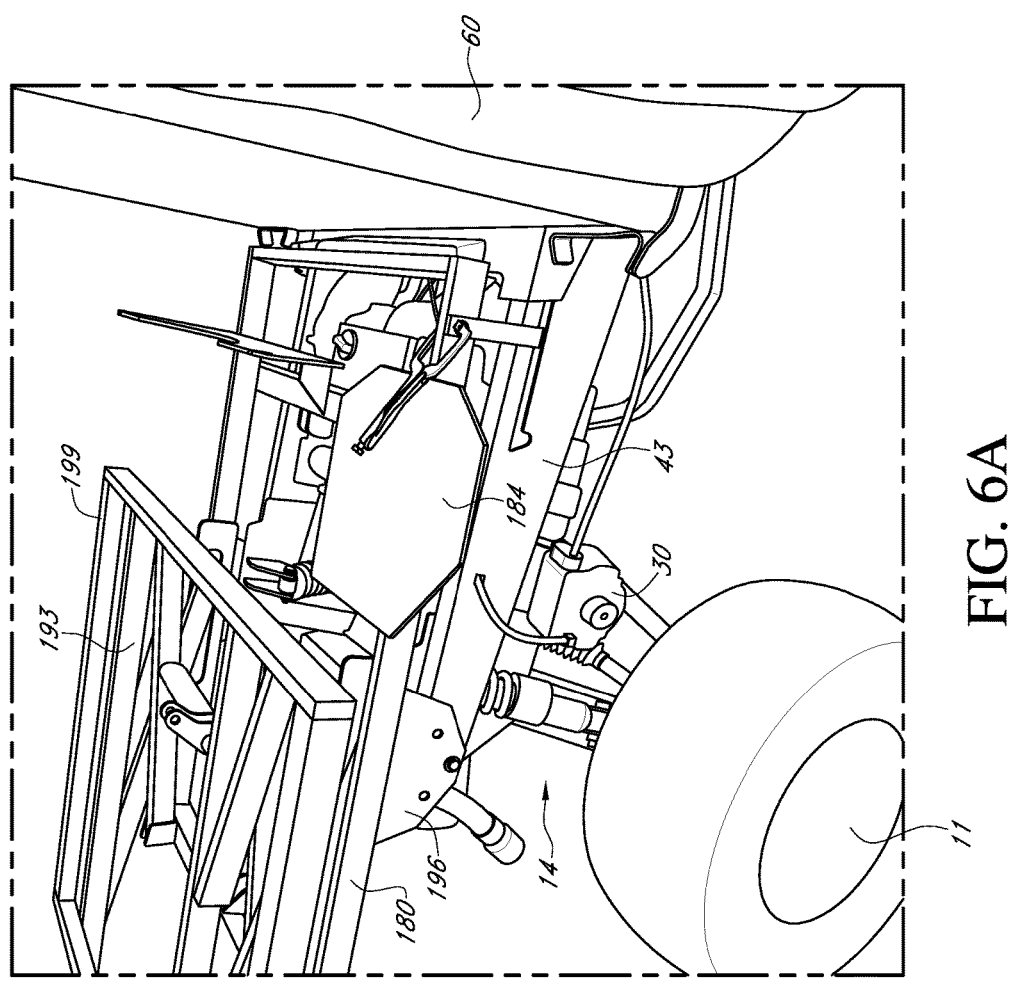
FIG. 6A is a side perspective view at the rear portion of the box mounting frame with the dump box removed.

FIG. 6A is a side perspective view at the rear portion of the box mounting frame 199 with the dump box 20 removed.

Figure 7:
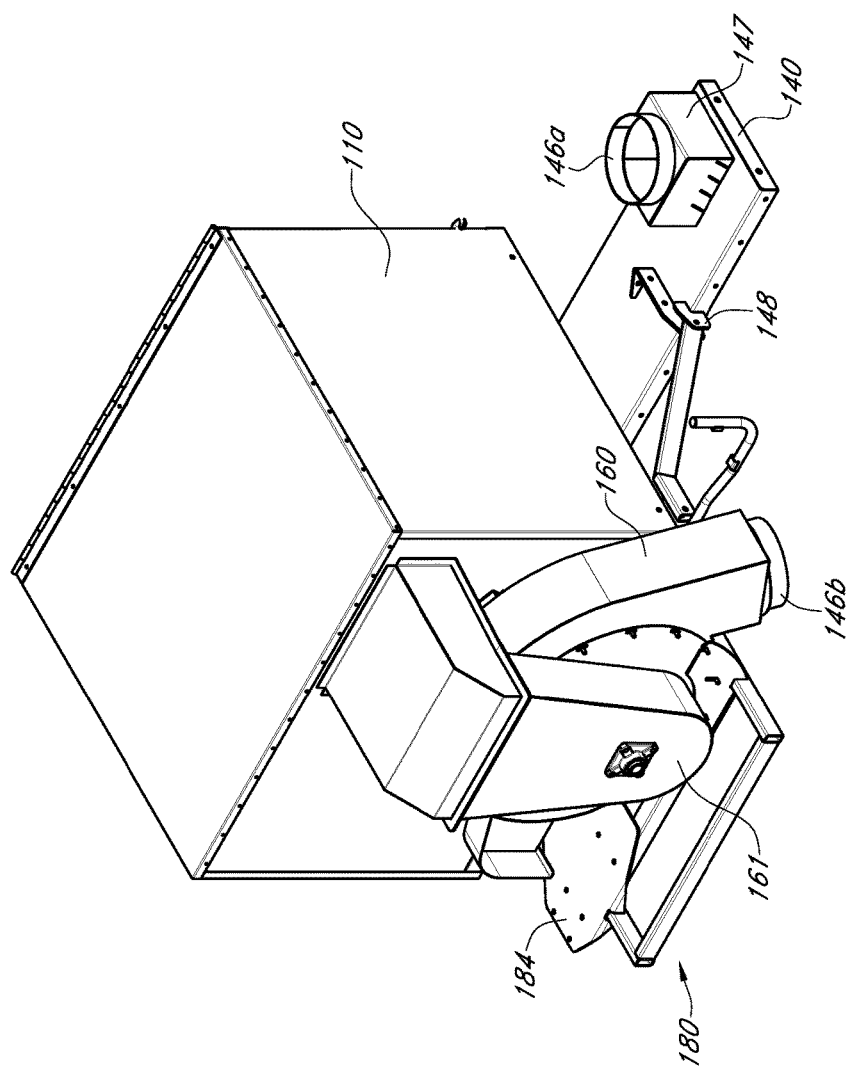
FIG. 7 is a first perspective view of the Sweeper and Frame for UTV, with the UTV removed for clarity, as used in operations for debris collection and transportation.

FIG. 7 is a first perspective view of the Sweeper and Frame 100 for UTV 10, with the UTV 20 removed for clarity, as used in operations for debris collection and transportation.

Figure 7A:
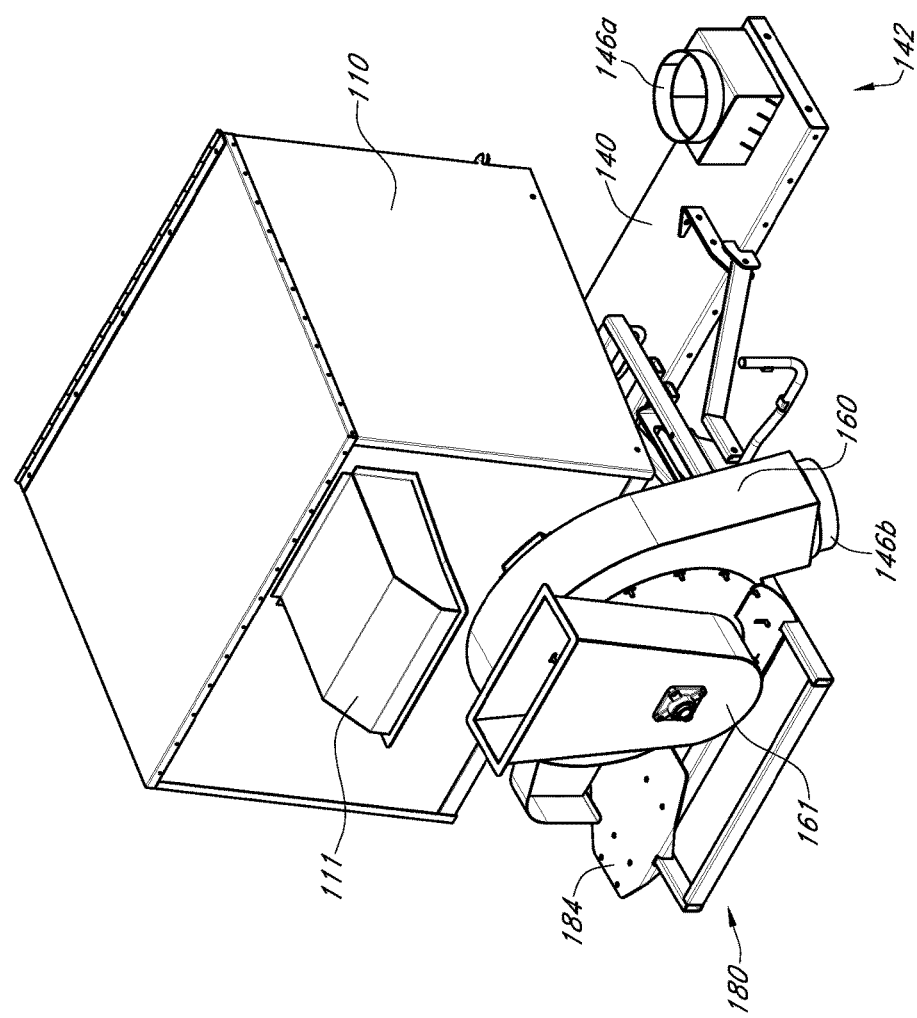
FIG. 7A is a second perspective view of the Sweeper and Frame for UTV, with the UTV removed for clarity, in a first lifted position, illustrating operation of the lifting system for lifting the debris collection box during the dumping operation as the debris collection box lifts off from the UT sweeper frame.

FIG. 7A is a second perspective view of the Sweeper and Frame 100 for UTV 10, with the UTV 10 removed for clarity, in a first lifted position, illustrating operation of the lifting system 200 with h-frame rectangular tube 201 and h-frame cross tube 202 coupled together for connection at a first end to the UTV mounting frame 180 via The second end of the connected of the debris collection box 110 during the dumping operation as the debris collection box 110 lifts off from the UT sweeper frame 180.

Figure 7B:
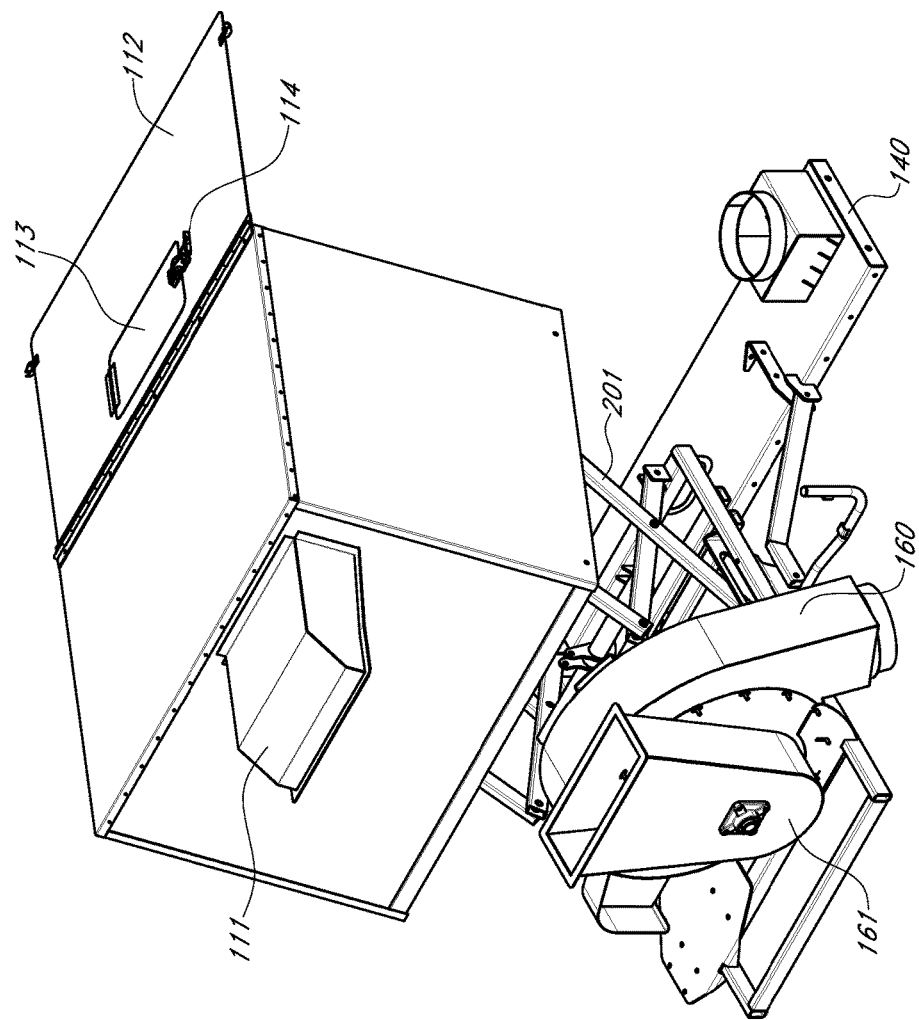
FIG. 7B is a third perspective view of the Sweeper and Frame for UTV, with the UTV removed for clarity, in a second lifted position, illustrating operation and further extension of the lifting system components during the dumping operation as the debris collection box lifts off from the UT sweeper frame

FIG. 7B is a third perspective view of the Sweeper and Frame 100 for UTV 10, with the UTV 10 removed for clarity, in a second lifted position, illustrating operation and further extension of the debris collection box 110 by the lifting system 200 during the dumping operation as the debris collection box 110 lifts off from the UT sweeper frame 180.

Figure 7C:
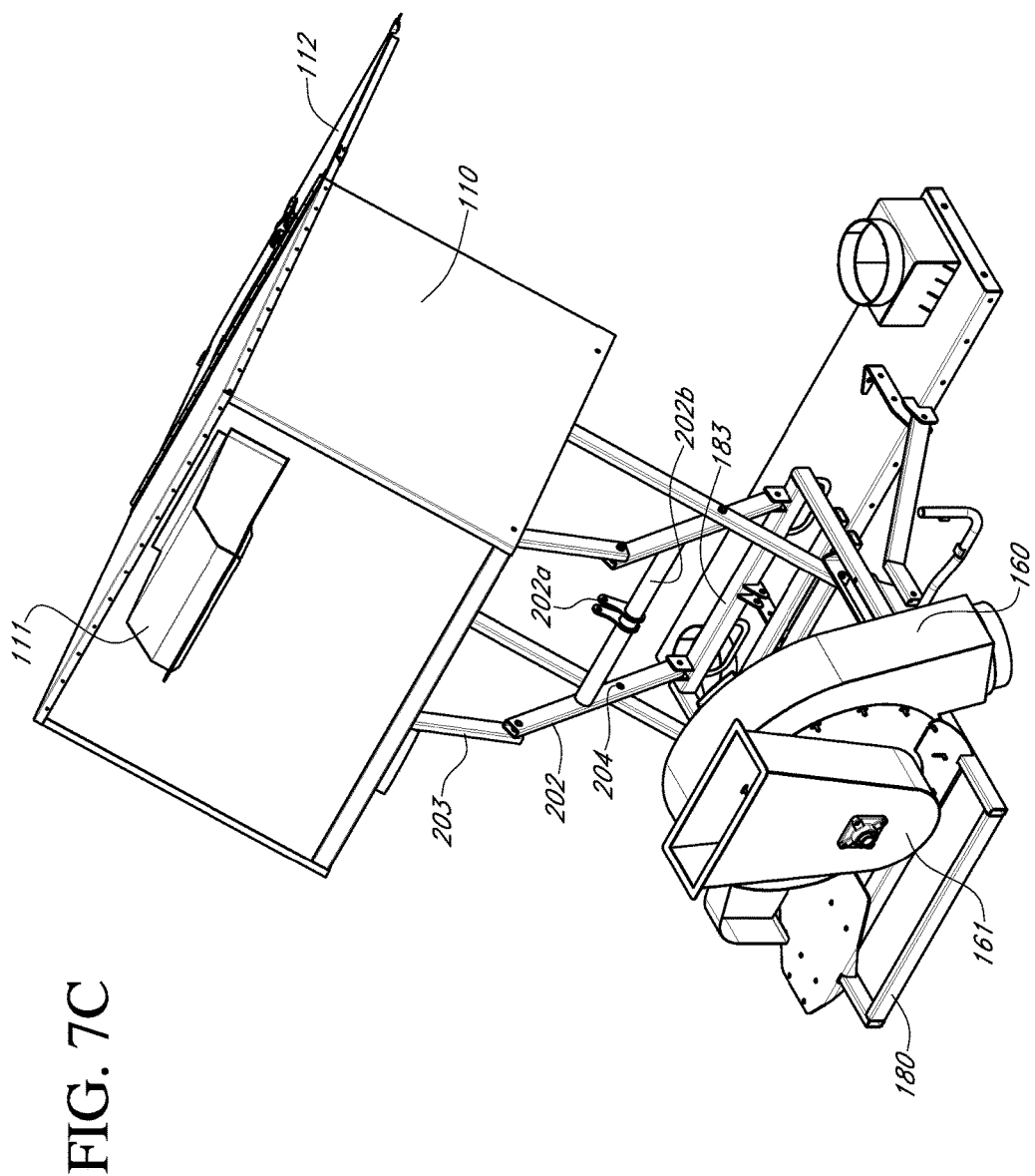
FIG. 7C is a fourth perspective view of the Sweeper and Frame for UTV, with the UTV removed for clarity, in a third lifted position, illustrating operation and full extension of the lifting system components during the dumping operation with the debris collection box lifted off the UT sweeper frame.

FIG. 7C is a fourth perspective view of the Sweeper and Frame 100 for UTV 10, with the UTV 10 removed for clarity, in a third lifted position, illustrating operation and full extension of the lifting system 200 during the dumping operation with the debris collection box 110 lifted off the UT sweeper frame 180.

Figure 8:
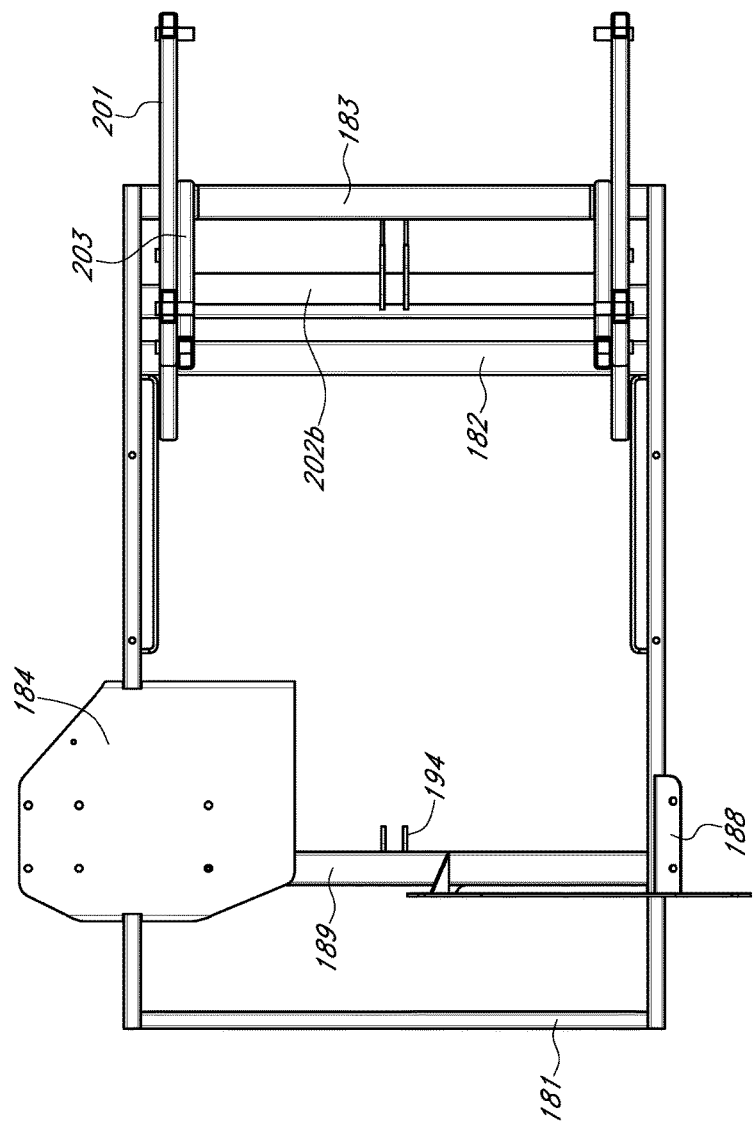
FIG. 8 is a top view of the UT sweeper frame and scissor arms of the debris collection box lifting system.

FIG. 8 is a top view of the UT sweeper frame 180 and arms of the debris collection box lifting system 200.

Figure 8A:
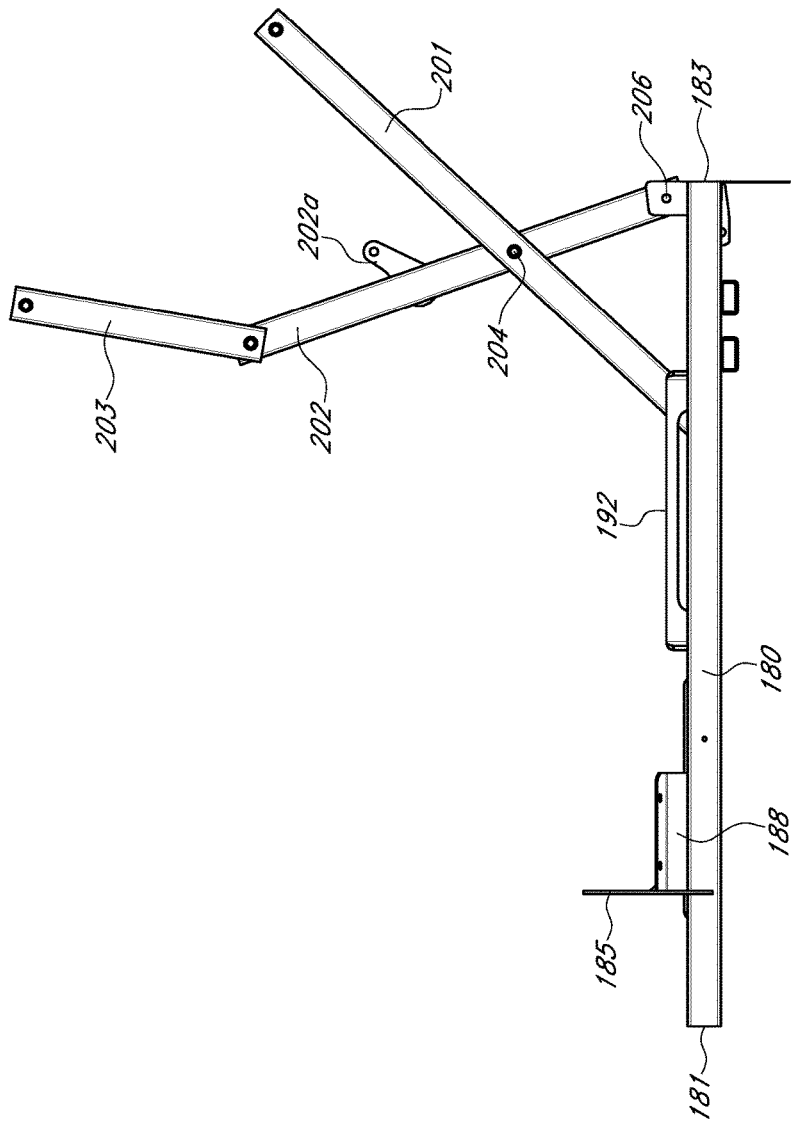
FIG. 8A is a side view of the UT sweeper frame and linkage H-frame of the debris collection box lifting system with the H-linkage fully extended.

FIG. 8A is a side view of the UT sweeper frame 180 and scissor arms of the debris collection box lifting system 200 with the scissor arms fully extended.

Figure 8B:
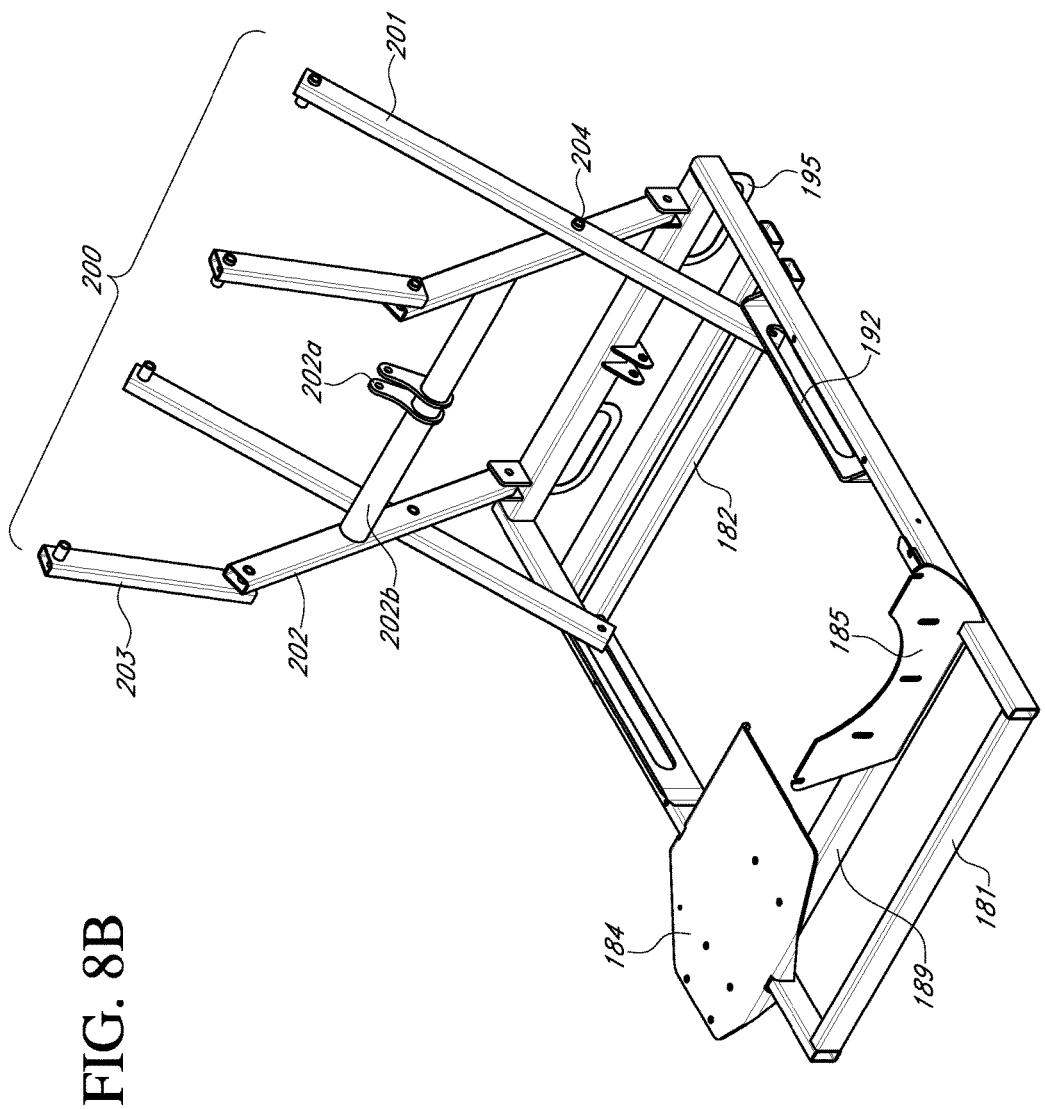
FIG. 8B is a front perspective view of the UT sweeper frame and H-frame of the debris collection box lifting system with the H-frame fully extended.

FIG. 8B is a front perspective view of the UT sweeper frame 180 and scissor arms of the debris collection box lifting system 200 with the scissor arms fully extended.

Figure 8C:
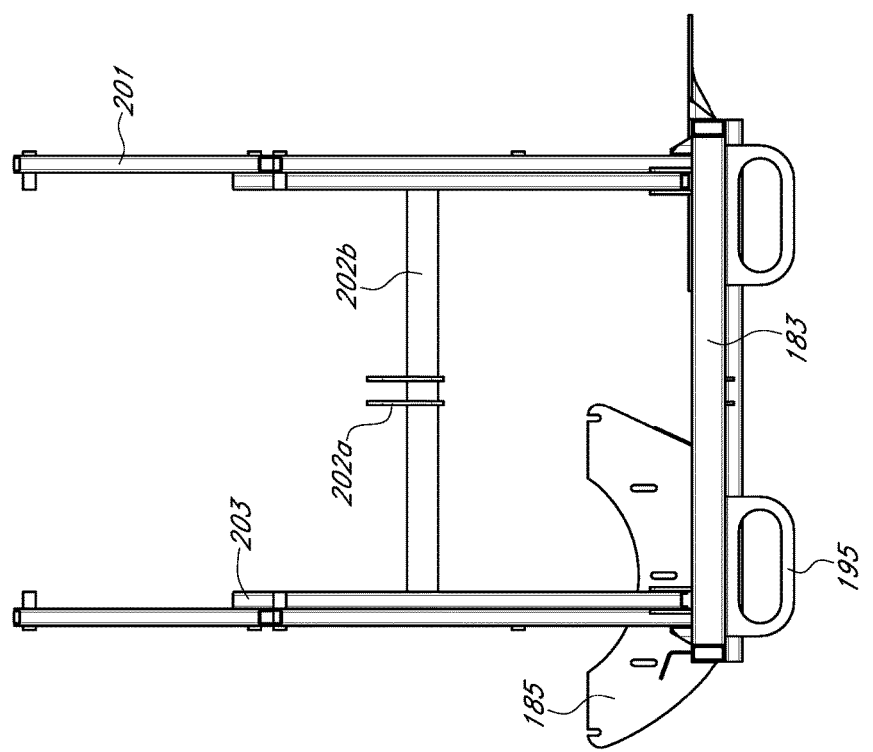
FIG. 8C is a rear view of the UT sweeper frame and H-frame of the debris collection box lifting system with the H-frame fully extended.

FIG. 8C is a rear view of the UT sweeper frame 180 and scissor arms of the debris collection box lifting system 200 with the scissor arms fully extended.

Figure 9:
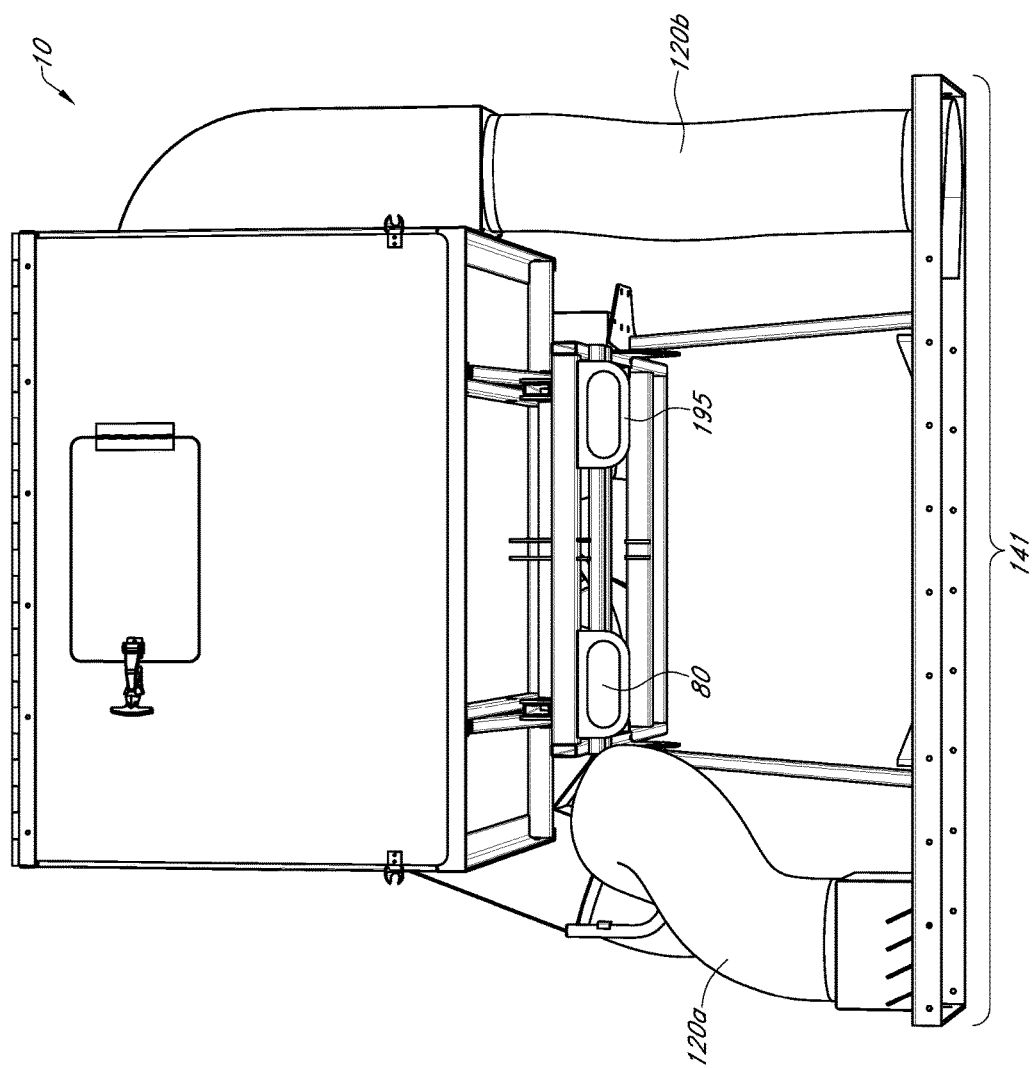
FIG. 9 is a detailed view of the rear end of the sweeper system attached to the mounting frame and mounted upon an UTV.

FIG. 9 is a detailed view of the rear end of the sweeper system 100 attached to the mounting frame 180 and mounted upon an UTV 10.

Figure 10:
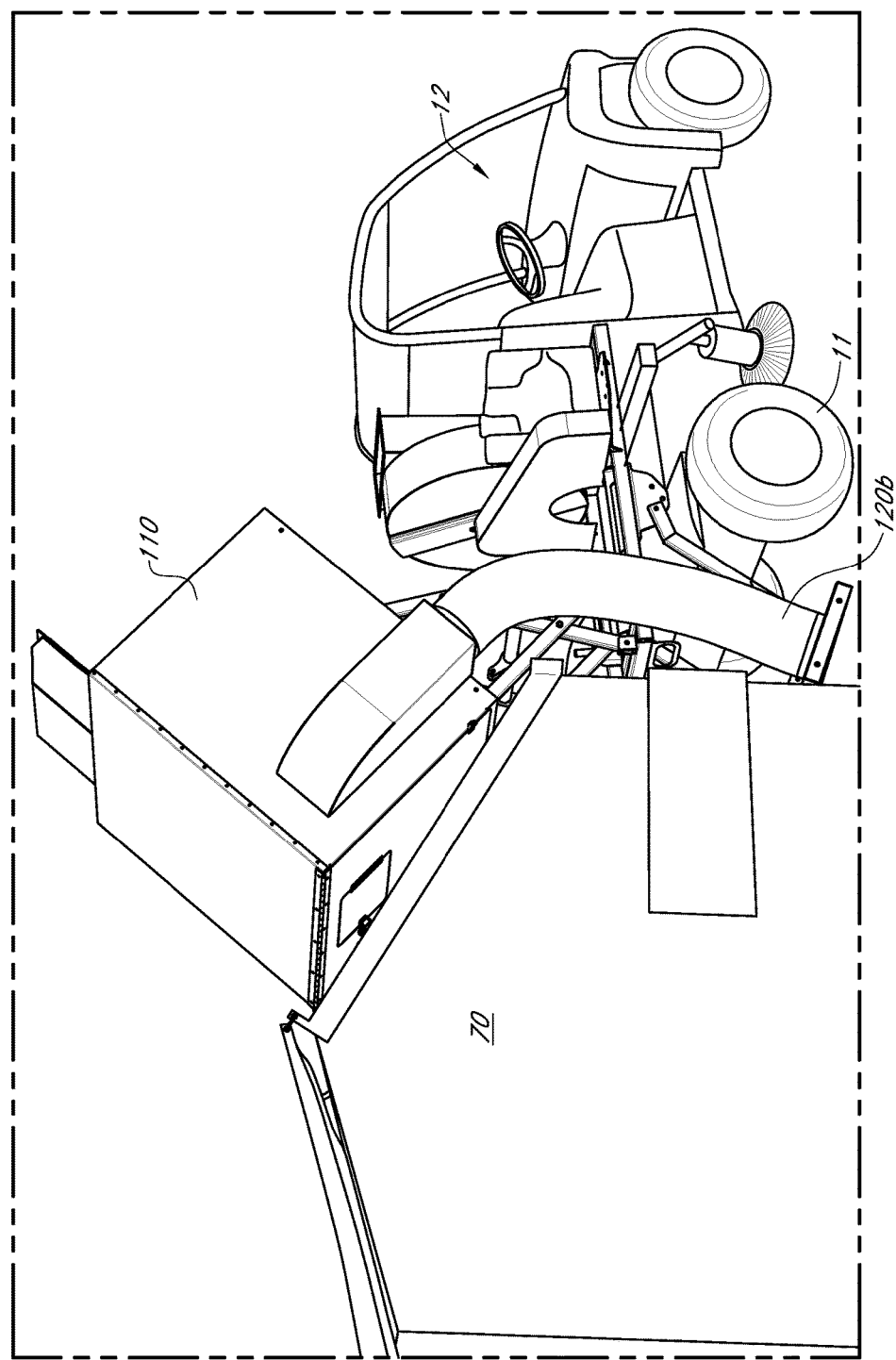
FIG. 10 is a perspective view of the sweeper system mounted to an UTV with the lifting system fully extended to empty dusts (aka debris) in the debris collection box to a dumpster.

FIG. 10 is a perspective view of the sweeper system 100 mounted to an UTV 10 with the lifting system 200 fully extended to empty dusts (aka debris) in the debris collection box 110 to a dumpster 70.

As shown and used herein, UTV 10 is defined as a "Side by Side" which is a small 2-6 person four-wheel drive off-road vehicle, also called UTV (Utility Task Vehicle) a ROV (Recreational Off-Highway Vehicle) or a MOHUV (Multipurpose Off-Highway Utility Vehicle) UTVs differ from all-terrain vehicles (UTVs) in that UTVs typically have a side-by-side seating arrangement, many have seat belts and roll-over protection, and most have a cargo box at the rear of the vehicle. UTVs generally have a higher payload capability and are longer and wider than UTVs. While most UTVs can carry 125 to 200 lbs. of cargo in addition to the operators weight, UTV payloads run from 800 to 1350 lbs. above the operator/passengers weight. The payload on a UTV is usually carried below the top of the tires—as opposed to an UTV, which carries its load above the fenders. This lower load-positioning can drastically lower the vertical center of gravity, which increases stability. UTVs come in a number of different configurations. Some have four tires on the ground, some have six or more. How these differences affect the operation of the UTVs can be confusing. Most of the functions required of these units have at least two aspects in common: the machines need to work off-road and to carry equipment. Working off-road requires the unit to maneuver around obstacles and over rough terrain. Carrying equipment requires the strength to haul a load and the ability to stay on top of softer ground.

As shown and disclosed throughout by the illustrative FIGS. 1-10, the sweeper system 100 for an UTV 10 has a removable dump box 20 and has an anterior portion and a posterior portion. The UTV frame 40 has a driver and passenger area 12 located at the anterior portion of the UTV frame 40 and a posterior portion configured to support and engage with a dump box 20 which is typically detachable from said UTV frame 40 via pins or other fasteners. As illustrated, without restriction or limitation, a power source 30, shown as an engine, but not so limited, is typically located within the posterior portion of the UTV frame 40 and positioned below the dump box 30. A suspension system 14 works with the UTV frame 40 and plurality of wheels and tires 11 (4-6) generally located around the perimeter of the UTV frame 10 to allow for powered rolling movement of the UTV 10, which is well known in the prior art. Typically, a power transmission system (not shown) is located within the UTV frame 40 and connects between the power source 30 and the plurality of wheels and tires 11 for powered rotation, as is well known in the prior art.

As shown and illustrated herein, the sweeper system 100 includes a UTV mounting frame 180, which is generally the same shape as the UTV frame 40 and also has an anterior portion and a posterior portion. The UTV mounting frame 180 is configured for easy attachment/detachment from the UTV frame 40 which provides for a self-contained sweeper system 100 having an engine mount plate 184 and a blower intake weldment 185 positioned in the anterior portion of the UTV mounting frame 180. A blower 160 for generating a regenerative air flow useful in vacuuming debris 2 (not shown but defined to include at least dirt, dust, sticks, trash, leaves, paper and/or combinations therein) from a (ground) surface 1, typically concrete or asphalt, but in no way limited to that, the blower 160 configured with a blower discharge outlet 162 for pressurized air flow discharge and a blower return air flow intake. The blower 160 coupled the blower intake weldment 185 of the UTV frame 180. As shown and discussed, the sweeper engine 130 is attached to the engine mount plate 184 and coupled to the blower 160 to provide a power source to the blower 160 to provide regenerative air flow (pressurized air out, debris laden air sucked back in) to the sweeper head 140 having a channel 142 formed by the sweeper head frame 141 with a sweeper head intake 147 at the first end of the sweeper head frame 141 allowing entry of pressurized air flow from the blower discharge outlet 162 via a discharge hose 120a coupled therein. The pressurized air flow sweeps through the channel 142 (typically formed from the frame and ridged plastic or rubber) and over a ground surface 1 located proximate the channel 142 to an outlet 143 positioned at the second end of the sweeper head frame 141 for debris distribution and collection. The outlet of the sweeper head 143 as shown is at the second end of the sweeper and is coupled to the second end of the return hose 120b for delivery of debris laden pressurized air to the debris collection box 110.

The debris collection box 110, as shown in FIG. 1 and FIG. 10, is located at the posterior portion of the UTV 10 and is coupled to the UTV frame 40, the debris collection box 110 having an inlet 170 coupled to a first end of the return hose 120b to receive debris collected via the pressurized air flow sweeping through said sweeper head channel 142 and returning through a filter 115 (not shown) positioned in the interior of the debris collection box 110, the debris collection box 110 having an outlet 111 coupled to the blower intake 161 for air suction.

As shown in FIGS. 7-8, the sweeper system 100 for an UTV 10 having a removable dump box 20 may be configured with a sweeper frame 180 having mounting frame front rail 181 and mounting frame rear rail 183 attached to a pair of mounting frame side rails 187, the pair of inner rails 182 are positioned across and between the pair of mounting frame side rails 187, adjacent the mounting frame rear rail 183, to generally form a square or rectangle, without limitation or restriction. As shown, the engine mounting rail mid frame 189 is positioned across and between the pair of mounting frame side rails 187, with the engine mount plate 184 and the blower intake weldment 185 affixed to the engine mounting rail mid frame 189 to minimize the size of the sweeper system 100. As shown and discussed, the sweeper frame 180 is configured to mount to the UTV frame 40 via a plurality of UTV frame apertures 47 already located in UTV frame 40 to increase the convenience of attaching/detaching the sweeper system 100. In another embodiment, the sweeper system 100 for a UTV 10 having a removable dump box 20, the sweeper frame 180 connects to the UTV frame 40 via a pair of UTV frame slots 46 positioned in a UTV frame left-side rail 42 and a UTV frame right-side rail 43. A shown in FIG. 5A, an "L" shaped UTV frame mounting bracket can be plugged into the UTV frame slot 46 at one end and the other end affixed to the sweeper mounting frame 180 via a fastener 48. The sweeper frame 180 may also be configured with a pair of UTV mounting brackets 196 configured to engage with and over UTV frame 40 proximate the UTV frame apertures 47 allowing insertion of a fastener 48 for securement of the sweeper frame 180 to the UTV frame 40 as shown in FIG. 5.

As shown in FIG. 4, the mounting frame side rail(s) 187 may be configured with a roller bearing bracket 192 and the roller bearing bracket 192 positioned between the mounting frame inner rails 182 and the engine mounting rail mid frame 189. A pair of linkage mount tabs 191 are then positioned on the mounting frame rear rail 183 to allow the first end of a lifting system 200a to be pivotably attached to the pair of linkage mount tabs 191 via pins 206. The second end of the lifting system 200b may be configured for engagement and attachment to the debris collection box 110. FIGS. 7-8 illustrate an embodiment of a lifting system using a H-Frame rectangular tube 201 having a first and a second end, wherein the first end is pivotally attached to the pair of linkage mount tabs 191 via pin(s) 206 and the second end is attached to a first end of a linkage pick-up tube 203. As shown, the second end of the linkage pick-up tube 203 may be configured for coupled engagement with the frame of the debris collection box 110 via pins or other means that allow pivoting. As shown, the first end of a H-frame cross tube 202 is coupled with a roller bearing 192a (not shown) for engagement with the rolling bearing bracket 192 and wherein the second end of the H-frame cross tube 202 is configured for coupled engagement with the debris collection box 110. One of ordinary skill will appreciate that debris collection box 110 as shown is configured as a cube but any shape appropriate to a particular application is satisfactory. Further, one of ordinary skill will appreciate that the ends of the lifting system 200 may be configured for direct pinned engagement with the debris collection box 110 as shown in FIG. 8 or with another frame which may be affixed to the debris collection box 110 as shown in FIGS. 6 and 6A. As shown, the H-frame rectangular tube 201 and the H-frame cross tube 202 are then pivotably attached via a H-frame pin 204.

To further improve the utility of the sweeper system 100, a cylinder bracket 194 maybe affixed to the engine mounting rail mid frame 189 for coupling with a hydraulic cylinder 49 at a first end to and a at second end to the floating head sweeper 140. The sweeper system 100 may also be configured with a hydraulic cylinder 49 at a first end to the cylinder bracket 194 and at a second end to the linkage cylinder lift bracket 202a to allow for powered lifting of the debris collection box 110 as shown in FIG. 10.

The following modifications, although not shown, would be obvious to one of ordinary skill in the art in view of the present disclosure. The various elements of the Sweeper and Frame may be separately formed and later engaged with one another (e.g., via mechanical fasteners, material fusing, chemical adhesives, etc.) or integrally formed with one another. The materials used to construct the Sweeper and Frame and various elements thereof will vary depending on the specific application of the Sweeper and Rack, but it is contemplated that steel, aluminium, polymers, other synthetic materials, natural materials, and/or combinations thereof will be especially useful for some applications. Accordingly, the above-referenced elements may be constructed of any material known to those skilled in the art or later developed, which material is appropriate for the specific application of the Sweeper and Frame, without departing from the spirit and scope of the Sweeper and Frame as disclosed and claimed herein.

Having described the preferred embodiments, other features of the Sweeper and Frame will undoubtedly occur to those versed in the art, as will numerous modifications and alterations in the embodiments as illustrated herein, all of which may be achieved without departing from the spirit and scope of the Sweeper and Frame disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and access of Sweepers and Frames collection and removal of debris using an UTV. Furthermore, the methods and embodiments pictured and described herein are no way limiting to the scope of the Sweeper and Frame and method of use unless so stated in the following claims.

It should be noted that the Sweeper and Frame is not limited to the specific embodiments pictured and described herein, but is intended to apply to all similar apparatuses and methods for providing the various benefits and/or features of a Sweeper and Frame. Modifications and alterations from the described embodiments will occur to those skilled in the art without departure from the spirit and scope of the Sweeper and Frame. It is understood that the Sweeper and Frame as disclosed herein extends to all alternative combinations of one or more of the individual features mentioned, evident from the text and/or drawings, and/or inherently disclosed. All of these different combinations constitute various alternative aspects of the Sweeper and Frame and/or components thereof. The embodiments described herein explain the best modes known for practicing the Sweeper and Frame and/or components thereof and will enable others skilled in the art to utilize the same. The claims are to be construed to include alternative embodiments to the extent permitted by the prior art.

While the Sweeper and Frame has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. A sweeper system 100 for an UTV 10 having a removable dump box 20 comprising:
  a) a UTV 10 having an anterior portion and a posterior portion, further comprising:
    i) a UTV frame 40 having a driver and passenger area 12 located at the anterior portion of said UTV frame 40 and a posterior portion configured to support and engage with a dump box 20 detachable from said UTV frame 40;
    ii) a power source 30 located within said posterior portion of said UTV frame 40 and positioned below said dump box 30;
    iii) a suspension system 14 cooperably engaged with said UTV frame 40 and a plurality of wheels and tires 11 generally located around the perimeter of said UTV frame 10 allowing powered rolling movement of said UTV 10;
    iv) a power transmission system located within said UTV frame 40 and connected between said power source 30 and said plurality of wheels and tires 11 for powered rotation; and,
  b) a sweeper system 100 further comprising:
    i) a UTV mounting frame 180 generally the same shape as said UTV frame 40 having an anterior portion and a posterior portion, said UTV mounting frame 180 configured for attachment/detachment from said UTV frame 40 having an engine mount plate 184 and a blower intake weldment 185 positioned in the anterior portion of the UTV mounting frame 180;
    ii) a blower 160 for generating a regenerative air flow useful in vacuuming debris 2 from a surface 1, said blower 160 configured with a blower discharge outlet 162 for pressurized air flow discharge and a blower return air flow input, said blower 160 coupled to said blower intake weldment 185 of said UTV frame 180;

iii) a sweeper engine 130 attached to said engine mount plate 184 and coupled to said blower 160 to provide a power source to said blower 160;

iv) a sweeper head 140 having a channel 142 formed by a sweeper head frame 141 with a sweeper head intake 147 at a first end of said sweeper head frame 141 allowing entry of pressurized air flow from said blower discharge outlet 162 via a discharge hose 120*a* coupled therein, said pressurized air flow sweeping through said channel 142 and over a ground surface 1 located proximate said channel 142 to an outlet 143 positioned at a second end of said sweeper head frame 141 for debris distribution and collection, said outlet 143 at said second end of sweeper coupled to a second end of a return hose 120*b*;

v) a debris collection box 110 located at the posterior portion of said UTV 10 and coupled to said UTV frame 40, said debris collection box 110 having an inlet 170 coupled to a first end of said return hose 120*b* to receive debris collected via said pressurized air flow sweeping through said sweeper head channel 142 and returning through a filter 115 positioned in the interior of said debris collection box, said debris collection box 110 having an outlet 111 coupled to the blower intake 161 for air suction.

2. The sweeper system 100 for an UTV 10 having a removable dump box 20 according to claim 1 wherein said sweeper frame 180 further comprises a mounting frame front rail 181 and mounting frame rear rail 183 attached to a pair of mounting frame side rails 187, wherein a pair of inner rails 182 are positioned across and between said pair of mounting frame side rails 187, adjacent said mounting frame rear rail 183, to generally form a rectangle, wherein an engine mounting rail mid frame 189 is positioned across and between said pair of mounting frame side rails 187, said engine mount plate 184 and said blower intake weldment 185 affixed to said engine mounting rail mid frame 189, said sweeper frame 180 configured to mount to said UTV frame 40 via a plurality of UTV frame apertures 47 located in UTV frame 40.

3. The sweeper system 100 for a UTV 10 having a removable dump box 20 according to claim 2 wherein said sweeper frame 180 connects to said UTV frame 40 via a pair of UTV frame slots 46 positioned in a UTV frame left-side rail 42 and a UTV frame right-side rail 43.

4. The sweeper system 100 for a UTV 10 having a removable dump box 20 according to claim 3 wherein said sweeper frame 180 is configured with a pair of UTV mounting brackets 196 configured to engage with and over UTV frame 40 proximate said UTV frame apertures 47 allowing insertion of a fastener 48 for securement of said sweeper frame 180 to said UTV frame 40.

5. The sweeper system 100 for a UTV 10 having a removable dump box 20 according to claim 4 wherein each said mounting frame side rail 187 is configured with a roller bearing bracket 192, said roller bearing bracket 192 positioned between said mounting frame inner rails 182 and said engine mounting rail mid frame 189, wherein a pair of linkage mount tabs 191 are positioned on said mounting frame rear rail 183, wherein a first end of a lifting system 200*a* is pivotably attached to said pair of linkage mount tabs 191 via a pin 206 and a second end 200*b* configured for engagement and attachment to said debris collection box 110.

6. The sweeper system 100 for a UTV 10 having a removable dump box 20 according to claim 5 wherein said lifting system 200 further comprises:

a) a H-Frame rectangular tube 201 having a first and a second end, wherein said first end is pivotably attached to said pair of linkage mount tabs 191 via pin 206 and said second end is attached to a first end of a linkage pick-up tube 203 wherein said second end of said linkage pick-up tube 203 is configured for coupled engagement with the frame of said debris collection box 110;

b) a H-frame cross tube 202 having a first and a second end, wherein said first end is coupled with a roller bearing 192*a* for engagement with said rolling bearing bracket 192 and wherein said second end of said H-frame cross tube 202 is configured for coupled engagement with said debris collection box 110; and, c) said H-Frame rectangular tube 201 and said H-frame cross tube 202 are pivotably attached via a H-frame pin 204.

7. The sweeper system 100 for a UTV 10 having a removable dump box 20 according to claim 6 wherein a cylinder bracket 194 is affixed to said engine mounting rail mid frame 189 and a hydraulic cylinder 49 is pivotably connected at a first end to said cylinder bracket 194 and at a second end to said floating head sweeper 140.

8. The sweeper system 100 for a UTV 10 having a removable dump box 20 according to claim 7 wherein a hydraulic cylinder 49 is pivotably connected at a first end to said cylinder bracket 194 and at a second end to linkage cylinder lift bracket 202*a*.

\* \* \* \* \*